United States Patent
Stack et al.

(10) Patent No.: US 11,025,558 B2
(45) Date of Patent: Jun. 1, 2021

(54) REAL-TIME RESOURCE PROCESSING BASED ON RESOURCE CHANNEL FACTORS

(71) Applicant: BANK OF AMERICA CORPORATION, Charlotte, NC (US)

(72) Inventors: Rosemary Carbery Stack, Wilmington, DE (US); Richard C. Clow, II, Morristown, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 63 days.

(21) Appl. No.: 16/262,669

(22) Filed: Jan. 30, 2019

(65) Prior Publication Data

US 2020/0244590 A1    Jul. 30, 2020

(51) Int. Cl.
G06F 15/173    (2006.01)
H04L 12/917    (2013.01)
H04L 29/08    (2006.01)

(52) U.S. Cl.
CPC ............ H04L 47/76 (2013.01); H04L 67/148 (2013.01)

(58) Field of Classification Search
CPC ............................ H04L 47/76; H04L 67/148
See application file for complete search history.

(56) References Cited

U.S. PATENT DOCUMENTS

| | | |
|---|---|---|
| 6,076,074 A | 6/2000 | Cotton et al. |
| 6,298,335 B1 | 10/2001 | Bernstein |
| 6,594,647 B1 | 7/2003 | Randle et al. |
| 7,376,587 B1 | 5/2008 | Neofytides et al. |
| 7,765,148 B2 | 7/2010 | German et al. |
| 7,836,088 B2 | 11/2010 | Chavda et al. |
| 8,165,381 B1 | 4/2012 | Ferris et al. |
| 8,401,904 B1 | 3/2013 | Simakov et al. |
| 8,626,592 B2 | 1/2014 | Simakov et al. |
| 8,630,945 B1 | 1/2014 | Sun et al. |
| 8,666,907 B1 | 3/2014 | Wang et al. |
| 8,818,884 B2 | 8/2014 | Marschall et al. |
| 9,990,613 B1 | 6/2018 | Bhatt et al. |
| 10,019,711 B1 | 7/2018 | Lerner |
| 10,223,688 B2 | 3/2019 | Fahn et al. |
| 2002/0152133 A1 | 10/2002 | King et al. |
| 2003/0154164 A1 | 8/2003 | Mascavage, III et al. |
| 2004/0139008 A1 | 7/2004 | Mascavage, III |

(Continued)

FOREIGN PATENT DOCUMENTS

WO    2017014815 A1    1/2017

OTHER PUBLICATIONS

U.S. Appl. No. 16/557,497, filed Aug. 30, 2019.

(Continued)

Primary Examiner — Philip B Tran
(74) Attorney, Agent, or Firm — Michael A. Springs; Moore & Van Allen PLLC; Jeffrey R. Gray

(57) ABSTRACT

A resource transfer system that provides intelligent distribution of resources based on resource routing selections, resource receipt selections, and/or resource processing advantages, and in response makes the resource transfers accordingly. The resources may be transferred based on the desired speed of distribution, the reason for distribution, the entities involved in the interaction, the level of security for distribution, level of protection for the interaction, or the like.

20 Claims, 2 Drawing Sheets

(56) References Cited

U.S. PATENT DOCUMENTS

| | | | |
|---|---|---|---|
| 2006/0174323 A1* | 8/2006 | Brown | H04L 63/0428 |
| | | | 726/3 |
| 2007/0150387 A1 | 6/2007 | Seubert et al. | |
| 2009/0313143 A1 | 12/2009 | Darensbourg et al. | |
| 2010/0082481 A1 | 4/2010 | Lin et al. | |
| 2010/0138269 A1 | 6/2010 | Cirpus et al. | |
| 2012/0136781 A1 | 5/2012 | Fridman et al. | |
| 2012/0197794 A1 | 8/2012 | Grigg et al. | |
| 2014/0114852 A1 | 4/2014 | Rajagopal et al. | |
| 2014/0344150 A1 | 11/2014 | Kapur | |
| 2015/0348151 A1 | 12/2015 | Francis | |
| 2016/0117666 A1 | 4/2016 | Davis et al. | |
| 2016/0140554 A1 | 5/2016 | Sun | |
| 2016/0180302 A1 | 6/2016 | Bagot, Jr. | |
| 2017/0024744 A1* | 1/2017 | Finch | G06Q 20/20 |
| 2017/0200209 A1 | 7/2017 | Cheng et al. | |
| 2017/0223106 A1* | 8/2017 | Katyal | H04L 67/06 |
| 2017/0364895 A1 | 12/2017 | Van Heerden et al. | |
| 2018/0189754 A1 | 7/2018 | Campbell et al. | |
| 2018/0302479 A1* | 10/2018 | Kolbe | H04L 67/28 |
| 2018/0373569 A1* | 12/2018 | Greene | G06F 9/5077 |

OTHER PUBLICATIONS

U.S. Appl. No. 16/262,669, filed Jan. 30, 2019.
Quain, S., How to Stop a PayPal Transaction in Progress, Aug. 10, 2018, https://smallbusiness.chron.com/stop-paypal-transaction-progress-53425.html.

* cited by examiner

REAL-TIME RESOURCE PROCESSING BASED ON RESOURCE CHANNEL FACTORS

FIELD

The present invention relates to a resource transfer system, and more particularly to a resource transfer system that transfer resources based on resource channel factors.

BACKGROUND

Resource processing for interactions typically requires a chain of various systems and entities in order to provide entry points for authorization, collection of resources, movement of resources along processing rails, gateways for network communications, or the like, which all require large amounts of processing capacity and memory storage in order to allow for such resource processing, and potential return processing.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

It should be understood that during typical interactions, such as automated clearing house (ACH) interactions, via card network, or the like, the interactions and all processing and communication related to such interactions occurs through the organization facilitating the interactions (e.g., the one or more organizations through which the resources are being transferred). As such, in some embodiments after an interaction is entered into a resource transfer system will send the resource organization a file at the end of the day for a plurality of interactions that are used for reconciliation. It should be understood that the entities entering the interaction have little control over how the resources associated with the interaction are processed, as well as little control over any communications between the entities when needed (e.g., should a resource change, rescission, refund, or the like be needed).

As will be described herein in further detail the present invention provides a resource transfer system that may rout resources using a real-time payment network. Using real-time network clearing, the system may provide real-time reconciliation processing along a real-time payment network. In this way, the system completely eliminates and/or reduces potential problems of misappropriation, as will be discussed herein. The system may confirm a transaction, confirm that resources have been exchanged, and provide end-of-minute confirmation that both sides of an interaction are whole and reconciliation has been completed.

Currently, the confirmation of reconciliation across various entities comes in the form of an end-of-day data packet from a payment network or rail not real-time (e.g., end-of-minute, near instantaneously, or instantaneously, or the like) as presented in the present invention. For example, an entity (e.g., individual, other party, or the like) may transfer resources across financial institutions to another entity. In this way, the individual's financial institution may remove resources from a resource pool (e.g., account) associated with a first entity at the financial institution and move it to a federal account. A payment network moves resources into another resource pool at another financial institution associated with the second entity. However, the other financial institution houses the resources until the end of the day reconciliation. Until then, the second entity does not have the resource in the resource pool.

In some embodiments, the invention provides a real-time resource transfer reconciliation process. Using real-time network clearing, the system may provide real-time reconciliation processing along a real-time payment network. As such, in real-time the resources are transferred out of a first entity's resource pool across the real-time payment network into the second entity's resource pool without lag from network processing. The system tracks the resources across the network and confirms a transaction, confirming that resources have been exchanged. Thereby providing a real-time confirmation that both parties are whole and reconciliation has been completed.

In some embodiments, the invention provides a resource transfer system, such as a real-time processing system. The resource transfer system provides intelligent distribution of resources based on resource routing selections, resource receipt selections, and/or resource processing advantages, and in response makes the resource transfers accordingly. The resources may be transferred based on the desired speed of distribution, the reason for distribution, the entities involved in the interaction, the level of security for distribution, level of protection for the interaction, or the like.

Embodiments of the invention comprise systems, computer implemented methods, and/or computer program products for a resource transfer processing system for transferring resources based on resource channel factors. Embodiments of the invention comprise receiving an indication of an interaction between a first entity and a second entity, and verifying the interaction between the first entity and the second entity. The invention further comprises receiving a routing selection from the first entity or a receipt selection from the second entity regarding the resources associated with the interaction, and transferring the resources based on the routing selection received from the first entity or the receipt selection received from the second entity.

In further accord with embodiments of the invention, the resources are transferred based on both the routing selection and the receipt selection.

In yet other embodiments, the invention further comprises identifying routing options for the first entity based on first entity information, and presenting the routing options to the first entity on a first entity computer system.

In still other embodiments of the invention, the first entity information comprises first entity preferences or past interactions of the first entity.

In other embodiments, the invention further comprises identifying receipt options for the second entity based on second entity information, and presenting the receipt options to the second entity on a second entity computer system.

In further accord with embodiments of the invention, the second entity information comprises second entity preferences or past interactions of the second entity.

In other embodiments, the invention further comprises identifying routing options for the first entity and receiving options for the second entity based on a resource transfer preference of an organization processing the resource transfer, and presenting the routing options to the first entity and the receiving option for the second entity.

In yet other embodiments, the invention further comprises determining the resource transfer based the routing selection or the receipt selection, and a resource transfer preference of an organization processing the resource transfer.

In still other embodiments, the routing selection or the receipt selection is based on speed of the resource transfer.

In other embodiments, the routing selection or the receipt selection is based on a reason for the resource transfer.

In further accord with embodiments of the invention, the routing selection or the receipt selection is based on protection for the resource transfer.

In other embodiments of the invention, the routing selection or the receipt selection is based on security for the resource transfer.

In yet other embodiments, the invention further comprises receiving the routing selection from the first entity, and determining receipt options for the second entity based on the routing selection from the first entity.

In still other embodiments, the invention further comprises receiving the receipt selection from the first entity, and determining routing options for the first entity based on the receipt selection from the second entity.

In other embodiments, the invention further comprises presenting a reward to the first entity for selecting a routing section from routing options.

In yet other embodiments, the invention further comprises presenting a reward to the second entity for selecting a receipt selection from routing options.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
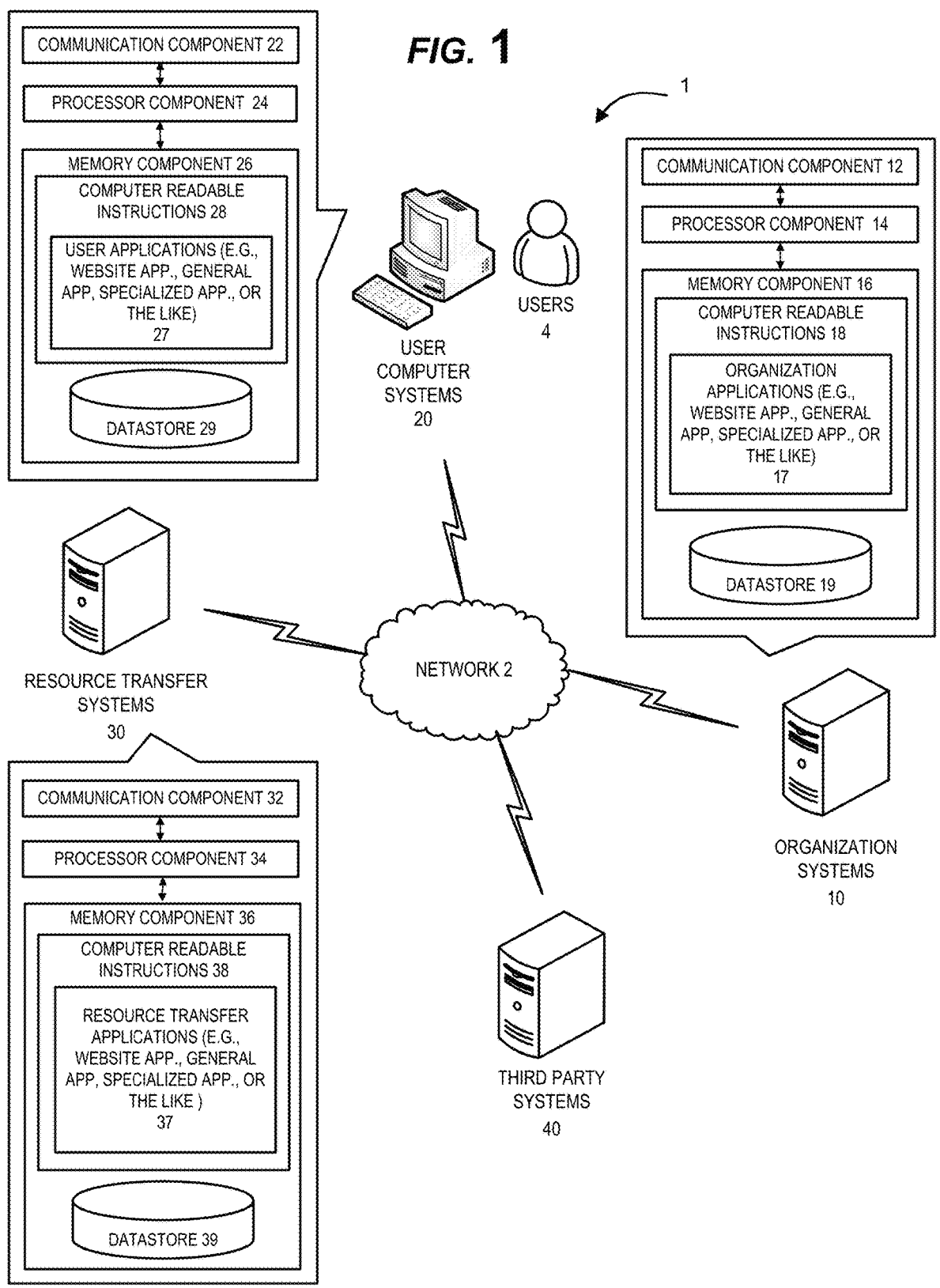

Having thus described embodiments of the invention in general terms, reference will now be made to the accompanying drawings, and wherein:

FIG. 1 illustrates a block diagram of a resource transfer system environment, in accordance with embodiments of the invention.

Figure 2:
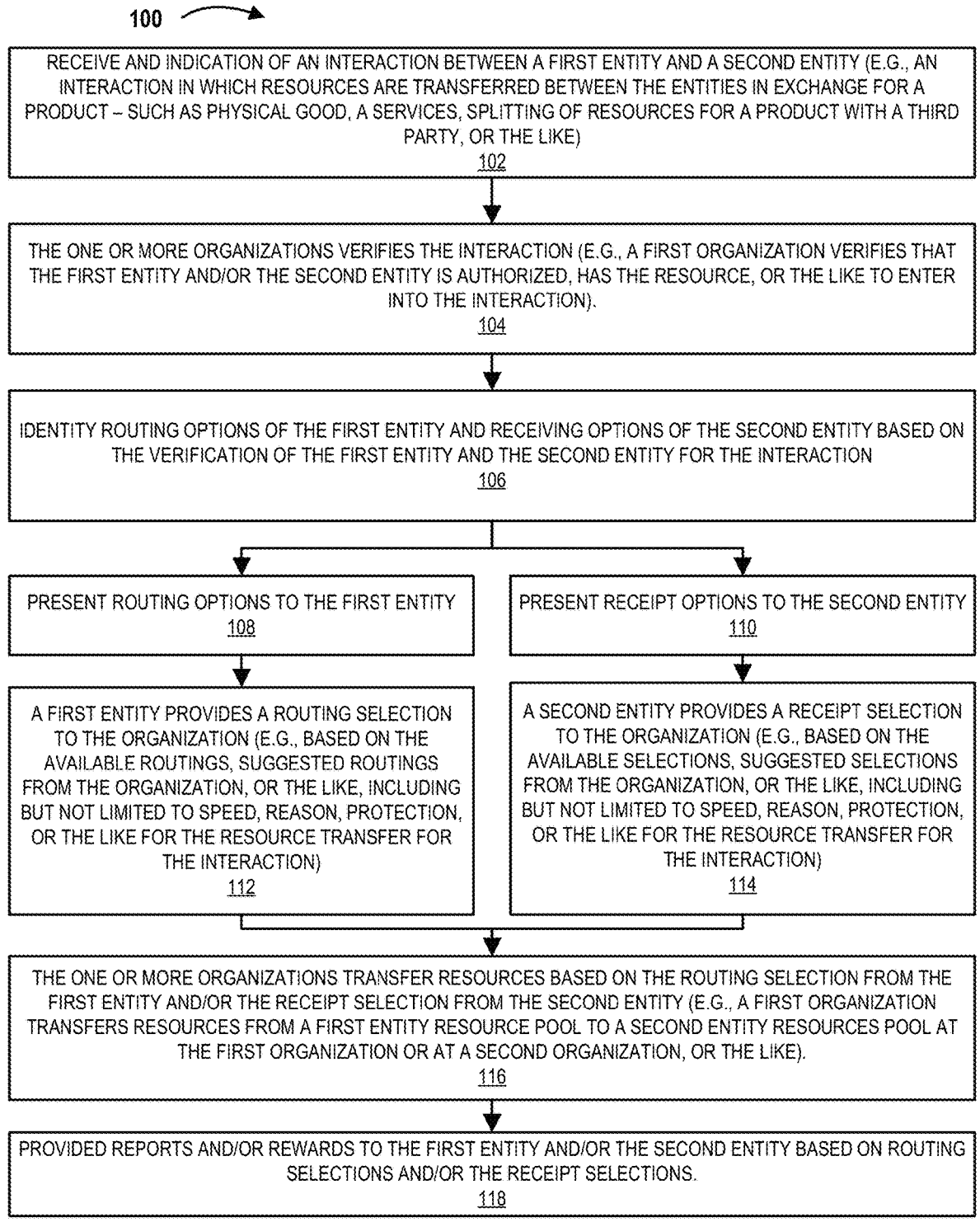

FIG. 2 illustrates a process for transferring resources based on resource channel factors, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Embodiments of the present disclosure relate to a resource transfer system that provides intelligent distribution of resources based on resource routing selections, resource receipt selections, and/or resource processing advantages, and in response makes the resource transfers accordingly. The resources may be transferred based on the desired speed of distribution, the reason for distribution, the entities involved in the interaction, the level of security for distribution, level of protection for the interaction, or the like. The embodiments of the present disclosure reduce the necessary computer processing capacity, increase the processing speeds associated with interactions, and reduce the memory storage requirements of real-time resource processing because the determination, presentation, and subsequent selections of routing options of a first entity and/or receiving options of a second entity in an interaction allow for intelligent transfer of resources. For example, based on the type of interaction, the entities involved in the interaction, the resource amount, the required speed of the interaction, or the like, the processing of such resources for an interaction can be handled in a way that reduces the processing capacity requirements, reduces the memory storage requirements, and/or increases the processing speeds. That is, if resources are being transferred in real time when the transfer does not require the resources for days, the system can hold off on the transfer until a time that processing capacity is readily available. In other examples, should the entities involved in the interaction know of each other (e.g., family), the processing capacity needed and the memory required to verify the entities and the interaction (e.g., including protection for the transfer) are not required (e.g., transfer can be made without additional verification). The benefits of the embodiments of the present disclosure with respect to the increased processing capacity, increased processing speeds, and/or reduced memory requirements will be apparent in view of the embodiments described herein.

FIG. 1 illustrates a resource transfer system environment 1, in accordance with embodiments of the invention. As illustrated in FIG. 1, one or more organization systems 10 are operatively coupled, via a network 2, to one or more user computer systems 20, one or more resource transfer systems 30 (e.g., a real-time resource transfer), one or more third party systems 40, and/or one or more other systems (not illustrated).

In this way, the one or more organization systems 10 may be the systems that run the applications that the organization uses within the organization's operations (e.g., that store and process interactions using resources from resource pools of entities). The users 4 (e.g., one or more associates, employees, agents, contractors, sub-contractors, third-party representatives, customers, or the like), may include customers, representatives of third-parties (e.g., merchants, third-parties intermediaries, or the like), employees of the organization, or the like. The users 4 may use the user computer systems 20 to enter into interactions with each other directly and/or through third parties systems 40 (e.g., customer user entering into an interaction with an employee user and/or the third party through the third party systems 40, first user entering into an interaction with a second user—such as user splitting resources, transferring resources with respect to a product, or the like). The resource transfer systems 30 may be utilized to allow the users 4 to enter into interactions, provide an interaction communication exchange that allows users to communicate regarding the interactions, provide routing and receiving options for the entities, and route the resources in response to entity selections, or the like. The third party systems 40, as discussed above may provide products (e.g., goods and/or services) associated with an interaction. The other systems (not illustrated) may act as an intermediary between the various systems described herein. The users 4 and/or third-parties may each be described as entities, such that a first entity may enter into interactions and/or communicate with a second entity using the resource transfer systems 30, which may be provided by an organization and/or another third-party, as will be described herein.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more resource transfer systems 30 (e.g., resource transfer communication exchange system, resource transfer routing system, or the like), the one or more third party systems 40, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with, or the like) the one or more user computer systems 20 and user applications 27, the one or more resource transfer systems 30 and resource transaction applications 37, the third party systems 40 (and applications thereof), and/or other systems and applications thereof (not illustrated). It should be understood that the one or more organization applications 17 may comprise the applications that are used by the organization to control, monitor, deliver, transfer, or the like, the resources of its customers (e.g., users and/or third party systems, such as product provider systems, or the like).

As further illustrated in FIG. 1, the one or more user computer systems 20 are operatively coupled, via a network 2, to the one or more organization systems 10, the one or more resource transfer systems 30, the one or more third party systems 40, and/or the one or more other systems (not illustrated). As illustrated in FIG. 1, users 4 may use the resource transfer systems 30 to enter into interactions with other entities (e.g., other users, third parties, or the like) in which resources are transferred, and moreover, communicate with the other entities without having to the involve the organization and/or transfer the resources based on routing and receiving options, as will be discussed in further detail herein.

It should be understood that the one or more user computer systems 20 may be any type of device, such as a desktop, mobile device (e.g., laptop, smartphone device, PDA, tablet, watch, wearable device, interaction terminal, or other mobile device), interaction terminal, server, and/or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, other user computer systems 20, the one or more resource transfer systems 30, the one or more third party systems 40, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to perform the actions described herein (e.g., enter interactions, transfer resources, communicate directly with the opposing entity, or the like).

As illustrated in FIG. 1, the one or more resource transfer systems 30 are operatively coupled, via a network 2, to the one or more organization systems 10, the one or more user computer systems 20, the one or more third party systems 30, and/or the other systems. The resource transfer systems 30, as will be described in further detail herein, may be utilized to facilitate interactions with resource transfers, interaction communications directly between the entities without the need for the organization that facilitated the resource transfer, processing of the resources based on routing selections and/or receiving selections of the entities, or the like. As such, the interactions made through the resource transfer systems 30 allow for resource transfers between entities (e.g., users 4, third parties, or the like), as well as communications between the entities directly with each other (instead of through traditional networks) and/or routing of resources that are more efficient, and thus, more cost effective, as will be discussed herein. It should be understood that the one or more resource transfer systems 30 may be a part of, and thus controlled by the organization, a third party, and/or by other systems (not illustrated). As such, the one or more resource transfer systems 30 may be supported by a third-party and/or by the organization.

The resource transfer systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more third party systems 40, and/or the other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more resource transfer systems 30 may have computer-readable instructions 38 stored in the one or more memory components 36, which in some embodiments includes the computer-readable instructions 38 of one or more resource transfer applications 37 that allow the entities (e.g., users 4, third party product providers, or the like) to enter into interactions using the user computer systems 20 through the one or more organization systems 10 (or the one or more third party systems 40), to communicate with each other directly regarding the interactions, and/or to provided routing selections and/or receiving selections for the resources, as will be described herein.

Moreover, the one or more third party systems 40 and/or other systems may be operatively coupled to and communicate with the one or more organization systems 10, the one or more user computer systems 20, and/or the one or more resource transfer system 30, through the network 2. The one or more third party systems 40 and/or the one or more other systems may have the same or similar components as the one or more organization systems 10, the one or more user computer systems 20, and/or the one or more resource transfer systems 30 (e.g., communication component, processor component, memory component—computer readable instructions for applications, datastore), and/or each other in the same or similar way as previously described with respect to the one or more organization systems 10, the one or more user computer systems 20, and/or the one or more resource transfer systems 30.

The one or more third party systems 40 may comprise the systems that a third party (e.g., a product provider) uses to enter into interactions with user 4. For example, the third-party may be a merchant that provides a product (e.g., goods or services) to users during an interaction, and collects resources through the one or more organization systems 10. It should be understood that both the user 4 and the product provider may have resource pools (e.g., accounts, or the like) with one or more organizations in order to allow for a resource transfer associated with the interaction.

A resource pool (e.g., an account) is the relationship that an entity (e.g., user or third-party—such as a merchant) has with an organization, such as a financial institution. Examples of resource pools include a deposit resource pool, such as an interaction account (e.g., a banking account), a savings resource pool, an investment resource pool, a money market resource pool, a time deposit resource pool, a demand deposit resource pool, a pre-paid resource pool, credit resource pool, non-monetary entity information associated with the entity, or the like. The resource pool is associated with and/or maintained by the organization. Moreover, it should be understood that resources may include funds in the resource pools of the entity and/or other property owned by the entity. The resources may be associated with resource pools or may be property that is not associated with a specific resource pool. Examples of resources associated with resource pools may be accounts that have cash or cash equivalents, or resource pools that are funded with or contain property, such as safety despots that contain jewelry, a trust resource pool that is funded with property, or the like. Examples of resources that may not be associated with resource pools may be products, such as antiques in a user's home, jewelry in a user's home, or the like.

A resource transfer refers to any movement of resources, including a change in ownership of the resources between a first entity (e.g., first user or first merchant) and a second entity (e.g., second user or second merchant) directly and/or through an organization. For example, a resource transfer may relate to an interaction (e.g., transaction, transfer, or the like), such as a purchase of a product (e.g., goods or services), a return of a product, a payment interaction, a credit interaction, lines of credit interaction, automated teller machine (ATM) interaction, or other interaction involving an entity's resource pool. An interaction may include one or more of the following: renting, selling, and/or leasing product(s) (e.g., cars, apartments, furniture, tools, or the like); making payments to creditors (e.g., paying monthly bills, paying federal, state, and/or local taxes; and the like); sending remittances; loading money onto stored value cards (SVCs) and/or prepaid cards; donating to charities; splitting payments for products (e.g., splitting hotel, dinner, lunch, transportation, or like costs), and/or the like.

An interaction involving a resource transfer may also refer to a resource transfer between entities (e.g., users, merchants, processor or settlement entities, and/or other entities) participating in and leveraging a settlement network operating in real-time (e.g., real or near real-time for twenty-four hours a day, seven days a week), wherein settlement of the interaction occurs at or very close in time to the time to the interaction. A real-time interaction may include a payment, wherein a real-time interaction system enables participants to initiate credit transfers, receive settlement for credit transfers, and make available to a receiving participant funds associated with the credit transfers in real-time, wherein the credit transfer may be final and irrevocable. Real-time interactions or payments provide marked improvements over conventional interaction clearing and payment settlement methods (e.g., automated clearing house (ACH), wire, or the like) which can require several hours, days, or longer to receive, process, authenticate a payment, and make funds available to the receiving participant which may, in total, require several back-and-forth communications between organization facilitating the resource transfer (e.g., financial institutions). In some cases, conventional settlement methods may not be executed until the end of the business day (EOB), wherein payments are settled in batches between financial institutions.

Real-time interactions reduce settlement time by providing pre-authentication or authentication at the time of a requested interaction in order to enable instantaneous (e.g., immediate or near-instantaneous) settlement between financial institutions at the time of the interaction, wherein resources or funds may be made immediately available to a receiving participant (e.g., payee) following completion of the interaction. Examples of real-time interactions include business to business interactions (e.g., supplier payments), business to consumer interactions (e.g., legal settlements, insurance claims, employee wages), consumer to business interactions (e.g., bill pay, hospital co-pay, payment at point-of-sale), and peer to peer (P2P) interactions (e.g., repayment or remittance between friends and family or others). In a specific example, a real-time interaction may be used for payment of a utility bill on the due date of the bill to ensure payment is received on-time and accruement of additional costs is avoided. In another example, real-time interactions may be especially beneficial for small entities and users (e.g., small merchants/businesses) that may have a heavier reliance on short-term funds and may not prefer to wait days for transaction settlements.

Real-time interactions not only provide settlement immediacy, but also provide assurance, misappropriation reduction, and bank-grade security to payments due to the inherent nature of the payment and user authentication infrastructure. Further, real-time interactions reduce processing requirements, processing memory, and/or processing costs due to the simplified nature of required communication when compared to conventional settlement methods. In some embodiments, real-time interaction systems further include information and conversation tools provided by the organization that enhance the experience of the entities participating in the in the interactions. It should be understood that in some embodiments the interaction requests for the resource transfers may comply with ISO 20022.

FIG. 2 illustrates a process for resource transfers based on resource channel factors, in accordance with embodiments of the invention. Block 102 of FIG. 2 illustrates that the one or more organizations receive an indication that a first entity enters into an interaction with a second entity. For example, an interaction may be a transaction that includes resources that are transferred between the entities in exchange for a product, such as a physical good, a service, splitting resources for a product with a third party, or the like, as previously discussed herein. The interaction indication may include interaction information, such as but not limited the resource pools involved in the interaction, the resource amount, the organization through which the resource transfer will take place, or the like. In some embodiments, the interaction information may include a request to transfer the resources utilizing the resource transfer systems for a real-time resource transfer (e.g., real-time payment, or the like).

Block 104 of FIG. 2 further illustrates that the one or more organizations facilitating the interaction will verify the interaction. For example, the one or more organizations may be resource management organizations, such as financial institutions that manage the resource pools of the entities, intermediaries that facilitate the identification of the entities (e.g., third-party processors, or the like), organizations that manage the computer systems or applications thereof that are used in the interaction, or the like. The verification of the interactions may include verifying that the entities have the resources and/or products for the interaction, that the entities are the entities they claim to be, that the interaction does not result in an indication of potential misappropriation that may result in prevention of the interaction (e.g., hold, deny, or the like the interaction), that resources are to be processed through a particular channel (e.g., a real-time resource transfer network, or the like).

FIG. 106 of FIG. 2 further illustrates, that some embodiments of the invention, the organization may identify the routing and receiving options for the resource transfer based on the entities involved in the interaction (e.g. a first entity, a second entity, or the like). For example, the organization may identify the channels available based on resource amounts involved in the interaction, deals the entities may have with specific channel (e.g., different entities, in particular large entities, may have cost discounts if they direct interactions along particular channels), if the entities both have resources within resource pools of the organization (e.g., straight through processing that can be in real-time and protected because the organization has a relationship with both parties), resource pools of each of the entities (e.g., the types of resource pools and/or the organizations that manage the resource pools), potential misappropriation of the interaction (e.g., based on the amount, the interaction history of the entities, the entities involved in the interaction, the frequency of related interactions for the entities, location of the entities at the time of the interaction, or the like), the resource pool (if any) selected by the entities to enter into the interaction, how the entities transferred resources in the past with each other or with other entities for similar interactions, or the like.

It should be understood that the determination of the routing and receiving options may be based on what is most beneficial to the first entity, the second entity, the organization, and/or combinations thereof. As such, it should be understood that the organization may determine all of the available options, a limited sub-set of all of the available options based on the options that are most beneficial for the first entity, the second entity, and/or the organization. That is, the routing options to be presented to the first entity may be limited to the most beneficial routing options for the first entity and/or the organization. Additionally, the receiving options to be presented to the second entity may be limited to the most beneficial receiving options for the second entity and/or the organization.

It should be understood that the organization is more familiar with the processing channels (e.g., processing rails, or the like) through which resource transfers for different types of interactions may be routed, based on the interaction information and/or the entities involved in the interaction. As such, in some embodiments, while the entities may desire to transfer resources using a particular type of channel, the organization may know that a desired channel may not be the most beneficial for the entities. As such, in some embodiments the organization may limit the determination of the routing options for the first entity and/or the receiving options for the second entity to a sub-set of all of the available options because some of the options may not be beneficial to the first entity and/or the second entity.

In some embodiments the routing options and/or the receiving options may be determined in part based on the first entity and/or the second entity. For example, first entity and second entity information may be utilized in order to determine an entity's (e.g., a user's and/or a product provider's) routing and/or receiving preferences. In some embodiments the entity information may be populated by the first entity and/or the second entity, and/or determined by the organization based on the interactions of the entities in the past. The entity information may be populated with the ways in which an entity has requested routing and/or receiving in the past. As such, the entity information may indicate that for resource transfers of particular amounts, with particular opposing parties, at particular timers of the day, month, or year, and/or like the entity may request a particular type of routing and/or receipt. Moreover, in some embodiments, if the first entity and second entity have had many interactions, the routing suggestion may include a real-time transfer and may be based on the past interactions, while if the first entity and the second entity have not interacted before the real-time resource transfer may not be an option for the interaction.

Block 108 of FIG. 2 further illustrates that the organization presents the routing options determined from block 106 to the first entity. For example, before an interaction is completed the organization may present in an interaction interface on the first entity computer systems (e.g., on a mobile device, a laptop, desktop, or the like) the one or more options for routing the interaction. The options may include the resource pools from which the resources should be transferred, the channels through which the resources may be transferred by the one or more organizations or a third-party, a schedule for placing a hold on the resources, for debiting the resources, and/or for delivering the resources to the second entity, the number, frequency, or amount of the resources to be transferred (e.g., multiple installments of the resource transfers), the security associated with the interaction (e.g., encryption methods, multiple authentication requirements, or the like), the protection associated with the interaction (e.g., requires processing over traditional rails to have protection, requires both resource pools at the same organization, or the like), the resources placed in escrow before acceptance by both parties, and/or the like. The routing options may be based on past routings of the first entity generally, and/or specifically with respect to the second entity. For example, the routing options may include an indication of how the first entity traditionally routes similar interactions with other entities, and/or how the first entity traditionally routes interactions with the second entity.

In some embodiments of the invention the routing options may be presented to the first entity with the advantages and/or disadvantages of each of the routing options. For example, the options may include routing the resources in real-time (e.g., which may come with a service payment and/or no protection for the transfer, such as no misappriation protection); routing the resources in real-time with protection (e.g., may include a service payment in order to provide protection for the real-time transfer); routing the payment within three days (e.g., which would not include the service payment and would include protection for the transfer); or routing the resource transfer within a week (e.g., no service payment, include protection, and may include a reward—such as a percentage of the resource interaction, such as 1% up to a pre-defined amount). Moreover, routing through the various available channels may be presented to the first entity, which may include advantages if the entity selects particular channel in addition to a particular routing option (e.g., a reward, protection for the interaction, security for the channel, or the like).

Additionally or alternatively, as illustrated in block 110 of FIG. 2, the organization presents the receiving options determined to the second entity. For example, before the interaction is initiated and/or completed, the organization may present on the second entity computer systems the one or more options for receiving the resources for the interaction. The options may include the resource pools to which the resources should be transferred (e.g., deposited, applied, accessed against, or the like), the channels through which the resources may be transferred by the one or more organizations or a third-party, a schedule for delivery of the resources, the number, frequency, or amount of the resources to be transferred, the resources received from escrow before and/or after acceptance of the interaction by both entities, and/or the like. For example, the options may include receiving the resources immediately (e.g., which may include a service payment); receiving the payment within three days (e.g., which would not include the service payment); or receiving the resource transfer within a week (e.g., no service payment and includes a reward—a percentage of the resource interaction, such as 1%), or the like. The receipt options may be based on past receipt of resources of the second entity generally, and/or specifically with respect to receiving resources from the first entity. For example, the receipt options may include an indication of how the second entity traditionally receives similar interactions with other entities, and/or how the second entity traditionally receives interactions from the first entity.

As illustrated by block 114 in FIG. 2, the organization may receive a routing selection from the first entity. For example, the first entity may select from the routing options from the interaction interface on the first entity computer system. The selection may be made by the first entity based on the available routings presented by the one or more organizations and/or by a third-party. The selection made by the first entity may include any of the routing options previously discussed with respect to block 108. For example, in some embodiments of the invention, the first entity may request to make the resource transfer at a particular speed (e.g., immediately, within 12 hours, within 1, 2, or 3 days, within a week, or the like), make the resource transfer through a particular channel, make the resource transfer in separate resource transfers, may hold the resources in escrow until the good is delivered and/or the service is provided, or the like.

As illustrated by block 114 of FIG. 2, the organization may receive a receipt selection from the second entity. For example, the second entity may select from the receiving options on an interaction interface on the second entity computer system. The selection may be made by the second entity based on the available routings presented by the one or more organizations and/or by a third-party. The selections may include any of the options discussed with respect to block 110. For example, in some embodiments of the invention, the second entity may request to receive the resource transfer at a particular speed (e.g., immediately, within 12 hours, within 1, 2, or 3 days, within a week, or the like), receive the resource transfer through a particular channel, receive the resource transfer in separate resource transfers, receive the resources from escrow until the good is delivered and/or the service is provided, or the like.

Block 116 of FIG. 2 illustrates that the one or more organizations transfer the resources based on the routing selection of the first entity and/or by the receipt selection by the second entity. It should be understood that in some embodiment the first entity and/or the second entity may choose different routings. As such, in some embodiments, the first entity may be presented the routing options before the second entity is presented the receipt options (e.g., the receipt options may be limited and/or no receipt options may be presented based on the routing selection of the first entity). Alternatively, in some embodiments, the second entity may be presented the receipt options before the first entity is presented the routing options (e.g., the routing options may be limited and/or no routing options may be presented based on the receipt selections of the second entity). Moreover, in some embodiments the routing options and/or the receipt options received by the organization may only be potential options, and the ultimate decision for processing the resources for the interaction may be determined by the organization and/or a third party alone and/or based on the desired routing option selected by the first entity and/or by the desired receipt option selected by the second entity. For example, in some embodiments even if the first entity requested to make the resource transfer immediately, since the second entity requested to receive the interaction within three days, the resource transfer may be deducted from the first entity resource pool, held and then transferred to the second entity resource pool within the desired timeframe.

Block 118 of FIG. 2 further illustrates that reports (e.g., daily, weekly, monthly, bi-monthly, quarterly, yearly, or the like) may be provided to the first entity and/or the second entity regarding the resource transfers of the entities. The reports may include the selections and/or the eventual routings and/or receipts for the interactions of each entity and/or an overview of the routings and/or receipts for each entity. The reports may include suggestions for how the entity should rout and/or receive further interactions going forward in order to maximize the advantages for the entity. In some embodiments the advantages may include rewards that entity received for the routing and/or receipt selection, and/or could have received if the entity selected other routings and/or receipts. The rewards may include cash back bonuses, reward points, travel miles, free interaction protection, increased resource transfer speeds for interactions, or the like. The rewards may include anything that provides motivation to the entities to make routing selections and/or receipt selections advantageous for the first entity, the second entity, and/or the organization or third party facilitating the interaction.

In some embodiments of the invention, the resource transfer systems, which may be a part of the organization or the third party, may be an automated system that selects the speed, schedule, security, protection, rewards, and/or the like for one or more of the interactions for one or more of the entities. In this way the resource transfer system may be an intelligent automated resource transfer system.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

What is claimed is:

1. A resource transfer processing system for transferring resources based on resource channel factors, the system comprising:
    one or more memory components having computer readable code stored thereon; and
    one or more processing components operatively coupled to the one or more memory components, wherein the one or more processing components are configured to execute the computer readable code to:
        receive an indication of an interaction between a first entity and a second entity;
        verify the interaction between the first entity and the second entity;
        receive a routing selection from the first entity or a receipt selection from the second entity regarding the resources associated with the interaction;
        receive the routing selection from the first entity or the receipt selection from the second entity;
        determine routing options for the first entity based on the receipt selection from the second entity or receipt options for the second entity based on the routing selection from the first entity; and
        transfer the resources based on the routing selection received from the first entity and the receipt options for the second entity or the receipt selection received from the second entity and the routing options for the first entity.

2. The system of claim 1, wherein the resources are transferred based on both the routing selection and the receipt selection.

3. The system of claim 1, wherein the one or more processing components are configured to execute the computer readable code to:
    identify the routing options for the first entity based on first entity information; and
    present the routing options to the first entity on a first entity computer system.

4. The system of claim 3, wherein the first entity information comprises first entity preferences or past interactions of the first entity.

5. The system of claim 1, wherein the one or more processing components are configured to execute the computer readable code to:
    identify the receipt options for the second entity based on second entity information; and
    present the receipt options to the second entity on a second entity computer system.

6. The system of claim 5, wherein the second entity information comprises second entity preferences or past interactions of the second entity.

7. The system of claim 1, wherein the one or more processing components are configured to execute the computer readable code to:
    identify the routing options for the first entity and the receipt options for the second entity based on a

| Docket Number | U.S. patent application Ser. No. | Title | Filed On |
|---|---|---|---|
| 8804US1.014033.3376 | To be assigned | REAL-TIME RESOURCE TRANSFER AND COMMUNICATION EXCHANGE SYSTEM | Concurrently herewith | resource transfer preference of an organization processing a resource transfer; and present the routing options to the first entity and the receipt options to the second entity.

8. The system of claim 1, wherein the one or more processing components are configured to execute the computer readable code to:

determine a resource transfer based the routing selection or the receipt selection, and a resource transfer preference of an organization processing the resource transfer.

9. The system of claim 1, wherein the routing selection or the receipt selection is based on speed of a resource transfer.

10. The system of claim 1, wherein the routing selection or the receipt selection is based on a reason for a resource transfer.

11. The system of claim 1, wherein the routing selection or the receipt selection is based on protection for a resource transfer.

12. The system of claim 1, wherein the routing selection or the receipt selection is based on security for a resource transfer.

13. The system of claim 1, wherein the transfer of the resources are based on the routing selection received from the first entity and the receipt options for the second entity.

14. The system of claim 1, wherein the transfer of the resources are based on the receipt selection received from the second entity and the routing options for the first entity.

15. The system of claim 1, wherein the one or more processing components are configured to execute the computer readable code to:

present a reward to the first entity for selecting the routing selection section from the routing options.

16. The system of claim 1, wherein the one or more processing components are configured to execute the computer readable code to:

present a reward to the second entity for selecting a receipt selection from the routing options.

17. A computer implemented method for transferring resources based on resource channel factors, the method comprising:

receiving, by one or more processors, an indication of an interaction between a first entity and a second entity;

verifying, by the one or more processors, the interaction between the first entity and the second entity;

receiving, by the one or more processors, a routing selection from the first entity or a receipt selection from the second entity regarding the resources associated with the interaction;

receiving, by the one or more processors, the routing selection from the first entity or the receipt selection from the second entity;

determining, by the one or more processors, routing options for the first entity based on the receipt selection from the second entity or receipt options for the second entity based on the routing selection from the first entity; and transferring, by the one or more processors, the resources based on the routing selection received from the first entity and the receipt options for the second entity or the receipt selection received from the second entity and the routing options for the first entity.

18. The method of claim 17, wherein the resources are transferred based on both the routing selection and the receipt selection.

19. A computer program product for transferring resources based on resource channel factors, the computer program product comprising at least one non-transitory computer-readable medium having computer-readable program code portions embodied therein, the computer-readable program code portions comprising:

an executable portion configured to receive an indication of an interaction between a first entity and a second entity;

an executable portion configured to verify the interaction between the first entity and the second entity;

an executable portion configured to receive a routing selection from the first entity or a receipt selection from the second entity regarding the resources associated with the interaction;

an executable portion configured to receive the routing selection from the first entity or the receipt selection from the second entity;

an executable portion configured to determine routing options for the first entity based on the receipt selection from the second entity or receipt options for the second entity based on the routing selection from the first entity; and an executable portion configured to transfer the resources based on the routing selection received from the first entity and the receipt options for the second entity or the receipt selection received from the second entity and the routing options for the first entity.

20. The computer program product of claim 19, wherein the resources are transferred based on both the routing selection and the receipt selection.

* * * * *